United States Patent

[11] 3,622,993

[72] Inventor Winston Theodore Duerdoth
Ruislip, England

[21] Appl. No. 885,000
[22] Filed Dec. 15, 1969
[45] Patented Nov. 23, 1971
[73] Assignee The Post Office
London, W. I., England
[32] Priority Dec. 18, 1968
[33] Great Britain
[31] 60,201/68

[54] DIGITAL COMMUNICATION SYSTEM
6 Claims, 8 Drawing Figs.

[52] U.S. Cl. .......... 340/147 R, 179/15 BA, 179/15 BS, 340/147 SY
[51] Int. Cl. .......... H04j 3/06
[50] Field of Search .......... 340/147, 147 SY; 178/69.8, 67; 179/15 BS, 15 BA

[56] References Cited

UNITED STATES PATENTS

| | | | |
|---|---|---|---|
| 2,986,723 | 5/1961 | Darwin et al. .......... | 340/147 SY |
| 3,109,897 | 11/1963 | Carbrey .......... | 340/147 SY |
| 3,457,372 | 7/1969 | Karnaugh .......... | 179/15 SY |
| 3,479,462 | 11/1969 | Yamato et al. .......... | 179/15 SY |

*Primary Examiner*—Donald J. Yusko
*Attorney*—Hall & Houghton

ABSTRACT: A digital communication system is described in which the local oscillators of the different switching centers of the system are synchronized by selectively increasing or decreasing the frequencies of the oscillators by preset amounts in response to phase advancing and retarding control signals respectively.

Figures 1, 1A:
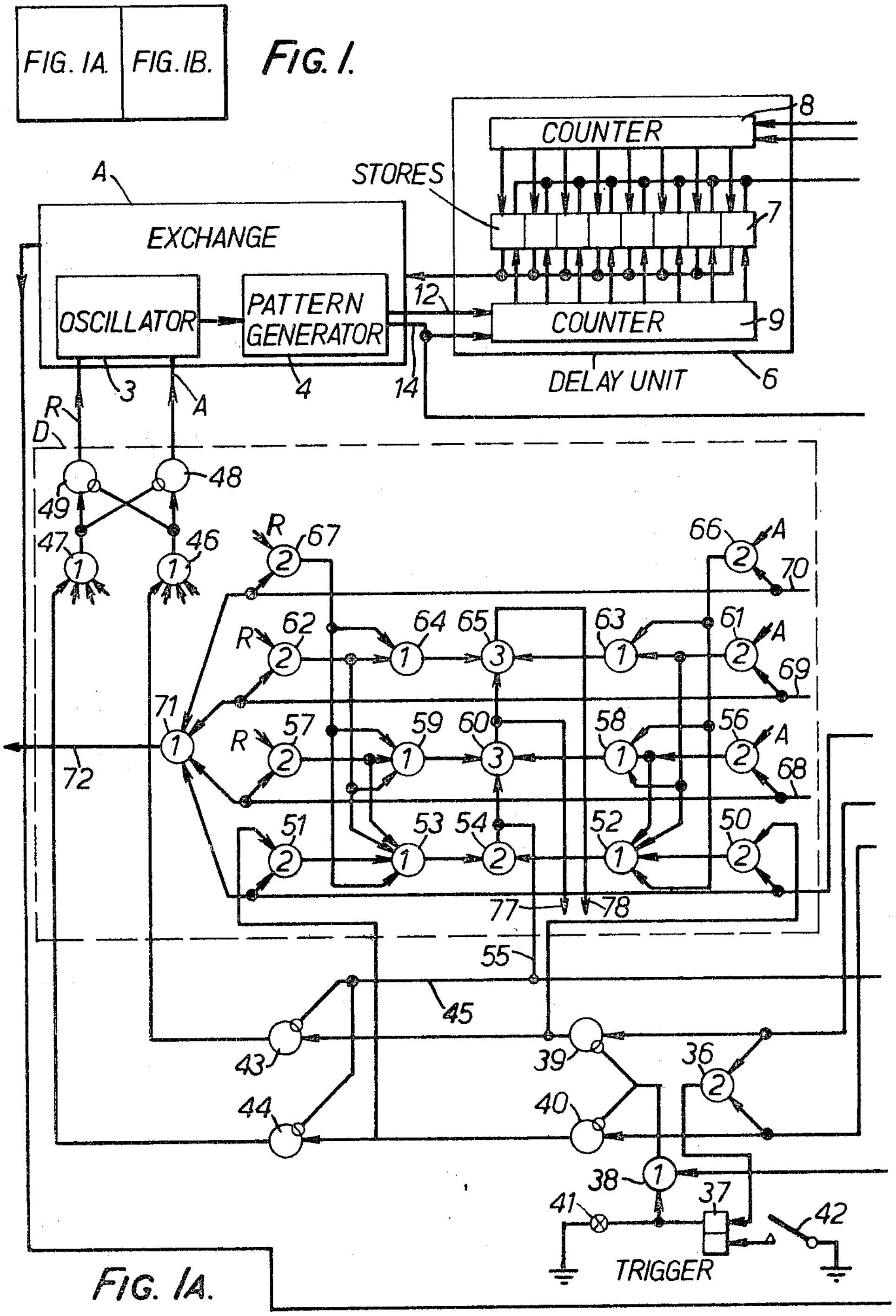

Each switching center includes for each incoming channel an aligner for absorbing phase differences between incoming digits and local digit times as determined by the oscillator. Each switching center includes for each link joining it to another switching center a comparator for comparing the phase differences between incoming digits and local digits in the centers at the ends of the link, the comparator producing a phase advancing or retarding control signal whenever the difference between the phase differences exceeds a threshold value, the sense of the difference determining the type of control signal.

To avoid blocking of the control system due to the simultaneous generation of conflicting control signals in any center the control signals from the different links are progressively inhibited in ascending order of importance of the links whenever the comparators detect excessive differences, until control signals of a single sense only are produced. To minimize the disturbance of the more important switching centers the threshold value above which the control signals are produced are larger links to such centers than for links to centers of lesser importance only, and the preset frequency shifts may be smaller for the more important centers. In any closed loop the threshold value of a direct links between two centers is less than the sum of the threshold values in any series of links joining them.

WINSTON T. DUERDOTH,
INVENTOR

BY Hall + Houghton
ATTORNEY

WINSTON T. DUERDOTH,

INVENTOR

BY Hall & Houghton

ATTORNEY

Winston I. Duerdoth

INVENTOR

BY Hall & Houghton

ATTORNEY

WINSTON T. DUERDOTH
INVENTOR

BY Hall & Houghton
ATTORNEY

DIGITAL COMMUNICATION SYSTEM

This invention relates to communication systems for digital information and is particularly concerned with the synchronizing of the system.

It has been proposed to transmit information from one location to another by the use of pulse code modulation, that is to say by sampling at regular intervals the amplitude of the signal that is to be transmitted, encoding the sampled amplitude and transmitting the encoded digits, the signal being reconstituted at the receiving station, so as to reproduce the original information. Because of the digital nature of the transmission it is necessary to ensure that the transmitting and receiving stations are synchronized, and while this can be achieved without difficulty when only two stations are involved, if a network of interlinked stations such as for example in a telephone system is to be synchronized the problem becomes more difficult.

It is an object of the present invention to provide an improved synchronizing arrangement for the digital communication system.

According to the present invention there is provided a communication system for digital information including a plurality of switching centers joined by links, each switching center having individual oscillator means and means for aligning information received on the or each link connected to the particular switching means of that switching center by temporarily storing the received information, each aligning means having means for comparing the phase of the information received over the respective link with the phase of the oscillator means of the particular switching center to produce a signal representing the phase difference, the particular switching center including a plurality of further comparing means respective to the links connected to the switching center for comparing the phase difference signals from the comparing means in the aligning means at both ends of the link, each further comparing means being able to produce a first output signal when the phase difference signals applied to it differ by more than a first threshold value in a first sense, and a second output signal when the phase difference signals applied to it differ by more than a first threshold value in the opposite sense, means responsive to a first output signal to cause a predetermined increase in the frequency of the oscillator means of the particular switching center and a predetermined reduction in the frequency of the oscillator means of the switching center at the other end of the link, and means responsive to the second output signal to cause a predetermined reduction in the frequency of the oscillator means of the particular switching center and a predetermined increase in the frequency of the oscillator of the switching center at the other end of the link, the first and second output signals being produced to change the frequencies of the oscillator means in such sense as to reduce the difference detected by the further comparing means, in which means are provided for disabling the control of the oscillator means by the first and second signals when both are present simultaneously from the same or different further comparing means.

It is a feature of an example of the invention that if the switching centers are joined by links to form one or more closed paths then the threshold values are so arranged that in any closed path the threshold value of a direct link between two switching centers is less than the total value of the threshold values of links forming another path between the two switching centers.

According to another feature of an example of the invention the switching centers are divided into groups according to rank and the threshold value of each link is normally dependent on the lower of the ranks of the switching centers joined by the link, the threshold value being larger for higher rank. The rate of change of phase of the oscillators, i.e., the frequency shifts, brought about by the signal from the comparing means are inversely dependent on the ranks of the switching centers, so that the higher rank switching centers are disturbed less than those of lower rank.

In a further feature of an example of the invention in order to avoid blocking of the system when the phase difference at a switching center is beyond the range of the aligners'capacities, the adjustment signals from one or more links connected in that switching center are inhibited until the phase difference is reduced to be within the range under the control of the uninhibited link or links. Certain of the links, referred to as a "-cross-border" links, may be arranged so that the production of adjustment signals is inhibited when a large phase error occurs between the oscillator of a switching center at an end of a cross border link and the oscillator of another switching center to which the first is connected by a link. Cross borders links are usually chosen to be circumferential ones in a system and are required to avoid "blocking" of the control as described below in any ring of more than three links.

Figure 2:
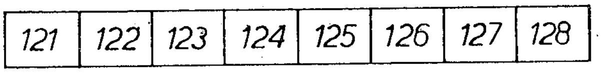
Figure 3:
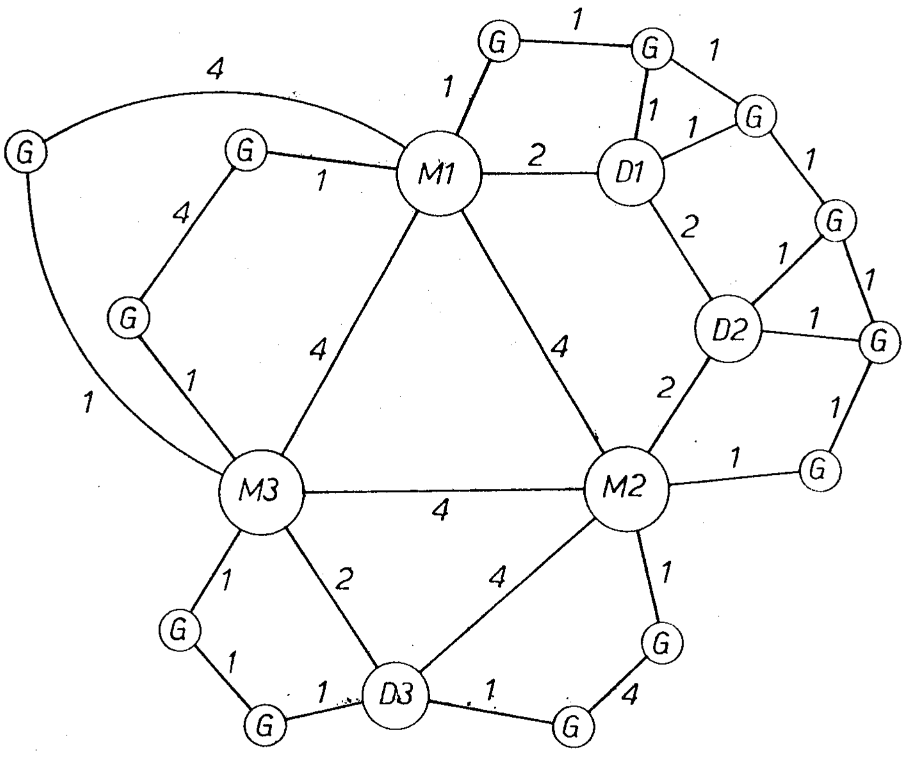
Figure 4:
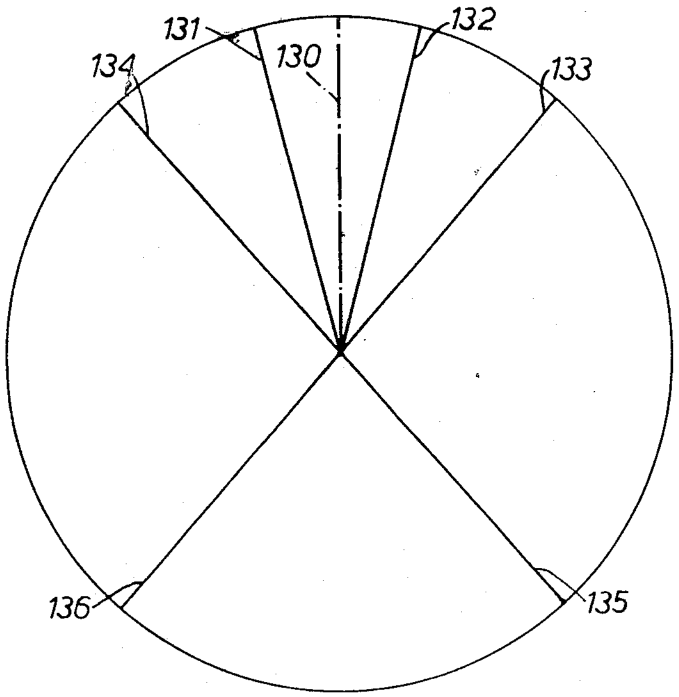
Figure 5:
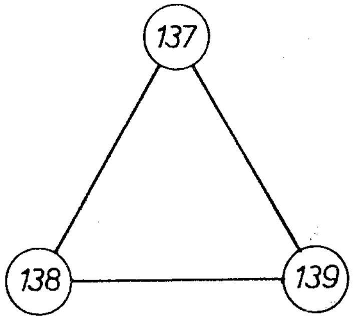
Figure 6:
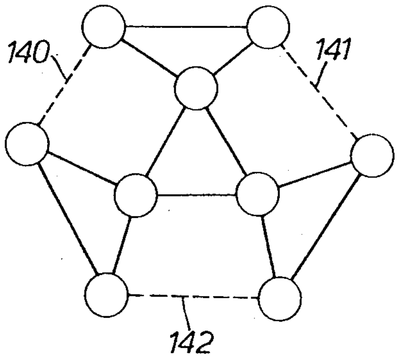

In order that the invention may be fully understood and readily carried into effect it will now be described with reference to the accompanying drawing of which:

FIG. 1A and B in a diagram of a single link joining two switching centers of a system according to one example of the invention, with some equipment at the switching centers common to all of the links connected to them, FIG. 2 is a diagram to be used in explaining operation of FIG. 1, FIG. 3 is a diagram of hypothetical system according to an example of the invention, FIG. 4 is a diagram to be used in explaining how blocking of controls can occur at a single switching center, FIG. 5 is diagram to be used in explaining how blocking of controls can occur within a group of three switching centers, and FIG. 6 shows a group of switching centers in which the blocking of controls is avoided by means of one example of the invention.

In FIG. 1 there is shown a single link consisting of channels 1 and 2 for communication in opposite directions between a first switching center A and a second switching center B. Between the switching centers A and B and the link are provided respective link synchronizers of which that for switching center B is represented by the rectangle C and that for switching A is shown in detail in block diagrammatic form; both synchronizers are of similar construction. As both switching centers have other links connected to them, although these links are not shown, there is a certain amount of equipment common to the links which is enclosed in the dotted rectangle D for the center A, and is represented by block E for center S. Both of the switching centers include respective oscillators that for A being represented by the rectangle 3 having its output connected to a pattern generator 4, the output of which is in turn fed to the switches of the switching center and to the link synchronizers of all the links connected to the switching center.

In the link synchronizer shown in detail it is fed to the delay unit 6 comprising the stores 7 and the counters 8 and 9 and also to a digital comparator formed by a trigger 15.

Pulse code information from switching center B to switching center A is transmitted along channel 2 and is applied through a line regenerator and clock extractor 5 to the delay unit 6. The clock extractor in the unit 5 produces a pulse train synchronized with the digits received along the channel 2 and this pulse train is applied to a divider 10 which has outputs on conductor 11 and 13 which are applied to the counter 8 in the delay unit 6. The signals on the conductor 11 are clock pulses synchronized with the digits incoming on the channel 2 and these cause the counter 8 to step along the stores 7 in cyclic succession so as to enter the digits from the channel 2 successively into the stores 7. The signals on the conductor 13 are used to start the counter 8 at a predetermined datum position so that the distribution of the digits from the channel 2 in the stores 7 is known. The counter 9 receives from the pattern generator 4 a series of clock pulses on the conductor 12, these pulses determining the digit times within the switching center A and serving to step the output of the counter 9 along the stores 7 in cyclic succession in the same order as the outputs of the counter 8. Each output of the counter 9 reads a respective store 7 and causes the corresponding digit to be fed to the switching center A. The pattern generation 4 produces another output, on the conductor 14, which serves to start the counter 9 at a predetermined datum position so that the timing of the information read from the stores 7 is known within the switching center A. In normal operation four of the stores 7 will be storing digits and four will be empty corresponding to a relative shift of four places between outputs of the counters 8 and 9. The delay unit 6 may also be referred to as an aligner.

In the example of the invention shown in FIG. 1 there is one pulse on the conductor 13 for each eight pulses on the conductor 11 and similarly there is one pulse on the conductor 14 for each eight pulses on the conductor 12 so that the pulses on the conductors 13 and 14 indicate, for example, the beginning of each group of eight digits entered into the stores 7 and read from the stores respectively. In order to obtain a measure of the "fill" of the delay unit 6, that is to say the number of stores 7 containing digits at that instant, the relative timing of the pulses on the conductors 13 and 14 is measured by applying these pulses respectively to set and reset a trigger 15 which, therefore, produces pulses of width depending on the relative timing. In order to convert these width-modulated pulses into digital form they are applied to a gate 16 which also receives rapid clock pulses on a conductor 17. These rapid clock pulses are in one example of p.r.f. twice the p.r.f. of the pulses on the conductor 12. The output of the gate 2 is fed to a binary counter 18. Thus the total normally recorded in the counter 18 is eight (1000corresponding to a relative shift of four digit times between the signals on conductors 13 and 14. The contents of the counter 18 are transferred to a shift register 19 in response to pulses derived, for example, from the pattern generator 4 and the counter 18 is reset to zero to start another count.

From the channel 2 there is derived information relating to the "fill" of the delay unit in the synchronizer C and indications as to whether A, R or "cut link" signals are being produced within this synchronizer and these signals are transmitted to switching center A from switching center B in a manner which will become evident from the following description. This information is derived from the channel 2 in predetermined time slots by means of gates 20 sequentially enabled by outputs from the divider 10. The outputs from the gates 20 are fed to respect stores 21 in the left-hand four of which is stored a digital representation of the "fill" of the delay unit in the synchronizer C and binary indications of the existence of A, R and "cut link" signals are stored in the right-hand three stores 21. The "fill" from the stores 21 is transferred to a shifting register 22 and the contents of this register and the register 19 are subtracted one from the other in a subtractor 23 from which a difference signal is produced which is stored in a shifting register 24 and a sign indication is produced which is stored in a store 25. As shown, the store 25 consists of two binary stores, one of which stores a "1" when the difference is positive and the other of which stores a "1" when the difference is negative. The contents of the shifting register 24 is fed to a threshold comparator 26 which has two output conductors 27 and 28. The comparator 26 produces an output on the conductor 27 when the difference signal from the register 24 exceeds a first, lower threshold value, and an output on the conductor 28 when the different signal exceeds a second and higher threshold value; the signal on the conductor 28 is referred to as an "out of limits" signal. The conductor 27 is connected to the controlling connections of two gates 29 and 30 respectively connected to the two parts of the sign store 25 and the outputs of the gates 29 and 30 are respectively connected to the inputs of OR-gates 35, 32 which also receive inputs from two of the stores 21 via conductors 33 and 34 respectively representing the R and A signals from the synchronizer C. The advancing (A) and the retarding (R) signals which form the outputs of the gates 31 and 32 respectively are fed to the inputs of a gate 36 of threshold 2, the output of which is used to set a trigger 37. Note that the "A" and "R" signals from the stores 21 are transposed to form "R" and "A" signals respectively; this is because a phase difference of one sense in the switching center A will appear as a phase difference of the opposite sense in switching center B. The set output of the trigger 37 is applied to an OR-gate 38, the output of which is used to inhibit gates 39 and 40 to which the advancing and retarding signals are respectively applied as inputs. The OR-gate 38 also receives as an input the "cut link" signal from the one of the stores 21 via conductor 35. When the trigger 37 is set an indicator lamp 4, is lit to warn the operator of this condition. A switch 32 which may be manually operated is provided for resetting the trigger 37.

The outputs of the gates 39 and 40 are respectively fed through gates 43 and 44 which are inhibit by a signal on a conductor 45 to OR gates 46 and 47 respectively. The outputs of gates 46 and 47 are applied to gates 48 and 49 respectively, each inhibited by the other output, to apply advancing and retarding signals to the oscillator 3. The oscillator 3 responds to an advancing signal with a predetermined increase in frequency. This change in frequency may differ in magnitude depending on the rank of the switching center. The gates 46 and 47 have a number of other inputs for the A and R signals derived from the components like 5–44 corresponding to other links connected to the switching center A. In the example shown the switching center A has four links associated with it. The link synchronizer C of switching center B includes similar equipment to that described above for switching center A and in order to transmit to the switching center B the "fill" of the delay unit 6 and the presence of A, R and "cut link" signals, stores 73 are provided. The "fill" of the delay unit 6 as stored in the shifting register 19 is transmitted to the left-hand four stores 73 via gate 74 under the control of a "transfer fill" signal on conductor 75. The A and R signals are fed respectively from gates 29 and 30 and the "cut link" signal is derived from a conductor 55 in a manner to be described later. When this information is to be transmitted to the switching center B, gates 76 are opened under the control of "send" signals and the information is passed to the channel 1 for transmission to the switching center B.

It will be appreciated that the equipment shown in FIG. 1 relates mainly to the single link comprising channels 1 and 2 but that the switching center A is connected to three other links in this example and each of these links will include a link synchronizer similar to that shown in FIG. 1. These three other links, for convenience, are referred to as X, Y and Z. The synchronizers of these three links all produce A, R and "out of limit" signals when required in the same way as described above with reference to FIG. 1. In FIG. 1 as shown it is assumed that the link comprising channels 1 and 2 is the least important of the links connected to the switching center A and that the links X, Y and Z are progressively of greater importance; the importance of a link is determined by the rank of the switching center which it joins to the switching center A, the most important link being connected to the switching center of highest rank. The purpose of the components 50 to 67 is to disable the control of the oscillator 3 in response to A and R signals derived from the different links, one link at a time starting at the link of least importance which, in this example, is the one shown in detail in FIG. 1. The disabling of this control is only carried out when both A and R signals are produced and an "out of limits" is produced at the same time; the A and R signals need not be produced from the same link. The A and R signals for the link shown in detail in FIG. 1 are derived from the outputs of the gates 39 and 40 respectively and are applied as respective inputs to gates 50 and 51 which receive as other inputs the "out of limits" signal on the conductor 28 produced by the comparator 26. The outputs of the gates 50 and 51 are applied through OR-gates 52 and 53 to inputs of gate 54. The output of gate 54 is the "cut link" signal for the link consisting of channels 1 and 2, and is applied via conductor 55 to the conductor 45 to disable gates 43 and 44 so preventing the A and R signals from the gates 39 and 40 being applied to the oscillator 3. This "cut link" signal is also applied to the extreme right-hand store 73 for transmission to the switching center B as described above. Corresponding to links X and Y there are provided sets of gates 56–60 and 61–65 similar to the set of gates 50–54 just described except that the outputs of gates 56 and 61 are also applied to the gate 53, the output of gate 61 is also applied to the gate 58 and the output of the gate 62 is also applied to the gate 59. In addition, the gates 60 and 65 are of threshold 3 respectively receiving the outputs of gates 54 and 50 as third inputs. For the most important link Z gates 66 and 67 only are provided, the outputs of which are applied as inputs to the gates 52, 58 and 63 and 53, 59 and 64. For the X link the "out of limits" signal is applied via conductor 68 as inputs to gates 56 and 57 which receive the A and R signals of this link respectively as other inputs. The "out of limits" signal of the Y link is applied via conductor 69 to gates 61 and 62, the A and R signals of this link forming respectively the other inputs of these gates. Gates 66 and 67 respectively receive the A and R signals for the link Z and receive the "out of limits" signal for this link via the conductor 70. In the operation of the arrangement just described if any link produces an "out of limits" signal and an R signal at the same time then gate 53 will produce an output. The gate 54 responds to the simultaneous inputs from gates 52 and 53 to produce a "cut link" signal which will inhibit the A and R signals from the link of least importance from being applied to the oscillator 3. If the A and R and "out of limits" signal are produced by the more important links then outputs will be produced from gate 60 or possibly both gates 60 and 65 on conductors 77 and 78 respectively as "cut link" signals for the links X and Y to inhibit the A and R signals from these links. There is no "cut link" signal for the link Z so that the oscillator 3 is controlled so as to restore synchronizm with the switching center of highest rank to which the switching center A is linked as soon as possible.

The gate 36 produces an output only when both A and R signals are produced from gates 31 and 32 at the same time, when this occurs the trigger 37 is set thereby producing an output which inhibits gates 39 and 40 from transmitting these A and R signals. It is also possible that A and R signals can be produced simultaneously from gates 4 and 47 and gates 48 and 49 are then inhibited to prevent their application to the oscillator 3 under these circumstances.

When the system is operating normally the signals transmitted from center B along the channel 2 and after regeneration and extraction of a clock signal by the unit 5 are entered into the stores 7 of the delay unit 6. The 8 storage elements of the stores 7 are sufficient storage for normally occurring variations between corresponding signals on the channel 2 and in the switching center A. The trigger 15, gate 16 and counter 18 together form a comparator for the signals on conductors 13 and 14 so that the number set up in the counter 18 represents the "fill" of the delay unit 6. The "fill" as stored in the counter 18 is compared with the "fill" of the corresponding unit in the synchronizer C and as stored in the shifting register 22 by the subtractor 23. The difference between these two "fills" is stored in the register 24. FIG. 2 shows the "fill" difference as stored in the resistor 24 the difference being divided into 8 groups 121 to 128 of which the group 121 represents that the "fill" of the delay unit 6 is very small, that is to say, the stores 7 of the unit 6 are mostly empty, and the "fill" of the corresponding delay unit in the synchronizer C is nearly at its maximum value with a few only of its constituent stores empty. The group 128 represents the inverse condition in which nearly all of the stores of the delay unit 6 are full and most of the stores of the delay unit in the synchronizer C are empty. The other groups 122 to 127 represent various intermediate sets of the difference between the "fills" of the two delay units. The "fill" difference stored in the register 24 is in binary-coded form and is compared in the comparator 26 with the first and second thresholds as described. If the "fill" difference exceeds the first threshold than an A or R signal is produced depending on the sign of the "fill" difference, these signals being produced respectively by gates 29 and 30. If the "fill" difference is very large, however, the comparator 26 will produce an output on conductor 28 indicating that this "fill" difference lies outside the limits provided by the second threshold value. It will be appreciated that by comparing the states of "fill" of the delay units of both ends of the link and using this comparison for producing the control signals for the oscillator changes such as, for example, due to temperature which effect the propagation delays of the channels 1 and 2 equally will not be detected by the comparator 7 because the "fills" will move in the same way and, therefore, such normally occurring changes will not affect the oscillator 3 and introduce unnecessary variation of its phase; the number of stores 7 in the delay unit 6 should be sufficient to accommodate these changes. Any change of the relative phases of the oscillators in the switching centers A and B will be detected by the comparators in the synchronizers at both ends of the link as a changing "fill" difference and by means of the mechanism described both oscillators will be controlled so as to bring the switching centers back into synchronism.

When a large l"fill" difference is detected by the comparator 26 and an "out of limits" signal is produced on conductor 28 the gates 50 and 51 are enabled to pass the A AND R signals, assuming that both do not occur together, so that the gate 54 is caused to produce "cut link" signal on the conductor 55. Note that when an A signal is transmitted over the link to the switching center B it becomes an R signal in its effect on the oscillator in the center B and similarly an R signal transmitted over the link becomes an A signal at the center B. The equipment operates as described above in the presence of a disturbance leading to the generation of advancing and retarding and "of limits" signals which lead to inhibition of the advancing and retarding signals from the synchronizers of the various links for the switching center in ascending order of importance until only either A or R signals are effective from links with "out of limits" signals, so that the oscillator 3 is free to follow such remaining control signals as are applied to it and can, therefore, rapidly be brought into synchronism.

A gate 71, which is an OR Gate is connected to receive all of the "out of limits" signals from the synchronizers of the various links, these "out of limits signals" being on conductors 28, 68, 69 and 70 respectively, and produces an output signal on conductor 72 whenever an "out of limits" signal is present. A signal on conductor 72 is used as described later to disconnect synchronizing control as provided by A and R signals from a "cross-border" link whenever any "out of limits" signal is present. Thus, if the link shown in detail in FIG. 1 were a "-cross-border" link the conductor 72 would be connected directly to the conductor 45.

All of the switching centers in a system are numbered in order starting from the main switching centers and continuing through the district switching centers to the group switching centers in general, the numbering being arbitrary in some cases. With this numbering the disconnection of synchronizing control by A and R signals at any switching center is effected on the links in descending order of the numbers of the switching centers at the other ends of the links. It is desirable that the numbering of the links be arranged so that when blocking occurs synchronizing control is first disconnected from links running circumferentially and retained by radial links.

In a large network involving many switching centers in which communication from any one center may be required to any other center it is desirable to arrange the system on a hierarchical basis and FIg. 3 shows an example of such a system. In FIG. 3 there are shown three main switching centers M1, M2, M3, three district switching centers D1, D2 and D3 and thirteen group switching centers G, the main centers being of highest rank, the district centers of intermediate rank, and the group centers of low rank. The three main switching centers are arranged at the apices of a triangle so that each has a direct link to both others. The first thresholds of the comparators of the links joining the main switching centers together are all equal and have the value 4, that is to say, the maximum permissible difference between the fills of the delay units before signals are generated to adjust the oscillator phases is four sections out of the eight shown in FIg. 2, each section containing, for example, two digits. In a similar way the first threshold values of the M1 –D1 links, the D1 –D2 and the D2 –M2 link are all two, and again the first threshold of the links joining the group switching centers to the main or district switching centers or to other group switching centers are generally speaking of threshold one although in three cases a threshold of 4 is used. It may be shown that for the optimum operation of the synchronizing of the system the threshold of a direct link between any two switching centers should be smaller than the total value of the thresholds of any system of links joining the two centers, so that the direct link itself is always effective to bring the respective oscillators of the switching centers into synchronism without having to utilize another switching center as intermediary. It is for this purpose that certain of the groups switching centers are connected to links of threshold 4 whereas normally they would be connected to link of unit threshold.

It is preferable to able to energize all of the links and switching centers of a previously dead system and bring them into synchronization automatically and in addition any major transient disturbance which may effect one switching center or more should preferably be followed by a rapid return to full synchronization of the system without external control.

Figure 1B:
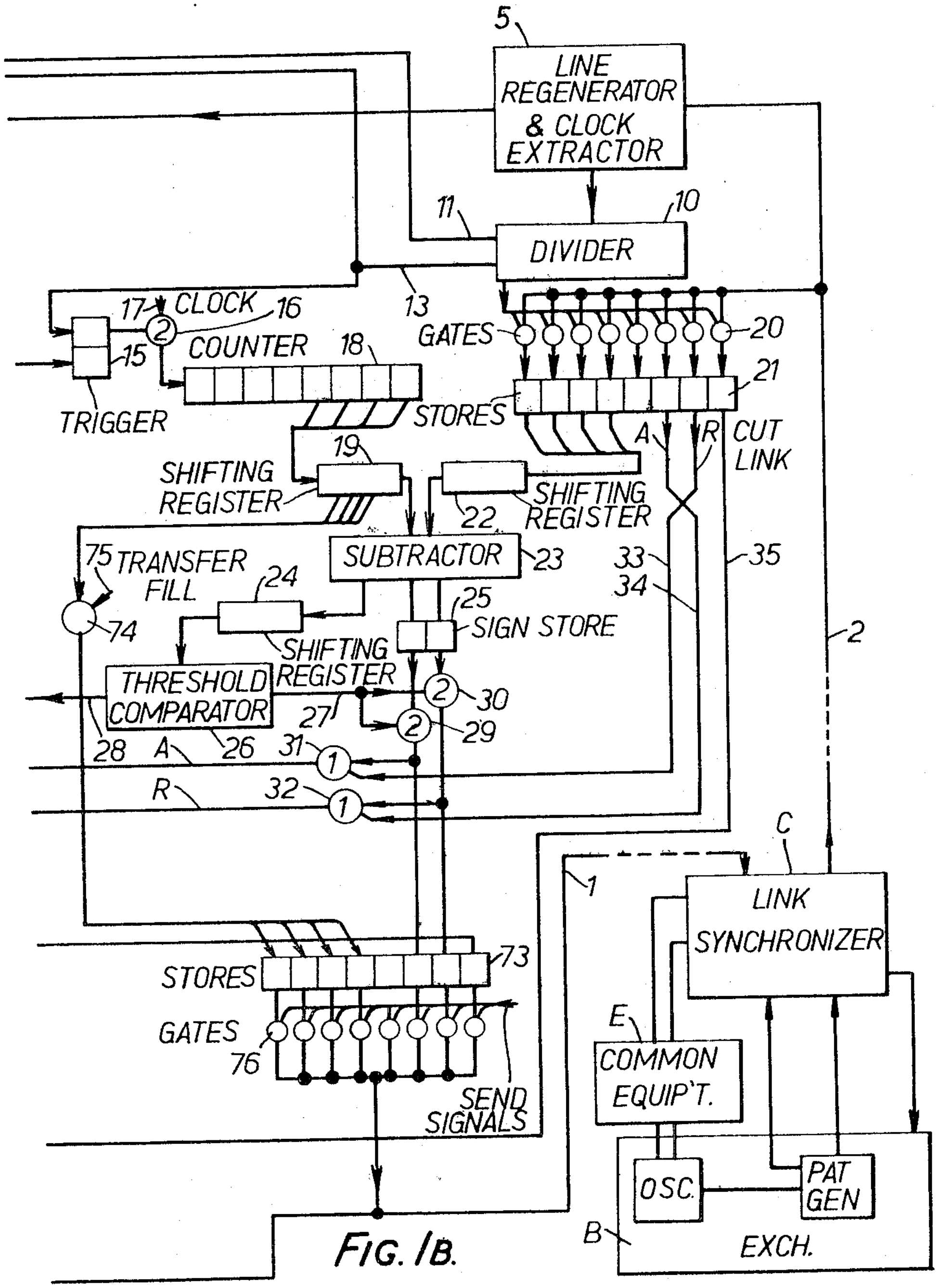

In the system described if both A and R signals are present at the same time the oscillator 3 is subjected to no change in frequency until either the A or the R signal is removed. In such a system without the facility for the selective remove of A and R signals in the presence of an out of limits signal as described above, it is possible for the synchronizing system in the oscillators to block so that the entire communication system can never become operative owing to lack of synchronization. Consider the oscillator of a single switching center in a system. If in FIG. 4 the dotted line 130 represents the correct phase for this oscillator and after a disturbance it still remains between the lines 131 and 132, then no adjustment is necessary and no signal is produced on the conductor 27 (FIG. 1B) for any of the links connected to the switching center. If following a disturbance, the phase remains between lines 133 and 134 the first threshold value is exceeded and the normal advancing and retarding signals will be produced by the fill comparators of the links and the necessary correction of phase will take place automatically. If the phase of the oscillator after the disturbance lies between the lines 133 and 135 or 134 and 136, the advancing and retarding signals are produced as before, but this time together with an out of limits signals, so that in the switching center only advancing or retarding signals are produced by not both, and the correction of the oscillator phase is still automatic. Between lines 135 and 136, however, the phase of the oscillator is such that both advancing and retarding signals can be produced by different links connected to the switching center and in the absence of circuitry to inhibit selectively the A and R signals applied to the oscillator the synchronizing system for the oscillator will be blocked and no control of the oscillator will be effected. However, in this position the out of limits signal is produced, and with the arrangement shown in FIG. 1, the A and R signals are selectively inhibited until only signals of a like kind are produced, either A's or R's, and the phase of the oscillator is brought back to the correct position under the control of the remaining signals when the full synchronizing system is rendered operative again.

In FIG. 5 there is shown a simple system of three switching centers 137, 138 and 139 joined by three links. If the switching centers 138 and 139 are similarly disturbed then blocking of the synchronizing system can take place in two ways. In the first of these ways all three links are producing out of limits signals and all three switching centers are receiving both advancing and retarding signals; this corresponds to the condition, for example, in each phase of the oscillators all the three switching centers are 120° apart. Although the three switching centers may be part of a large network, as the center 137 has not been disturbed it will receive no additional synchronizing signal from the remainder of the network and the synchronizing system of the three centers will remain blocked unless the selective inhibition of A and R signals is carried out as described above with reference to FIG. 1. When the synchronizing controls of links 138 –139 and 137–139 are disconnected, firstly the oscillator of switching center 138 will be drawn into phase with the oscillator of switching center 137 and then synchronizing control of the link joining switching centers 137 and 139 will be reestablished and the oscillator of switching center 139 brought back into phase with that of center 137 and then synchronizing control of the link joining switching centers 137 and 139 will be reestablished and the oscillator of switching center 139 brought back into phase with that of center 137 when the full synchronizing system will be restoréd. The second way in which blocking can occur arises when the phases of the oscillators of the switching centers 138 and 139 happen to be sufficiently close after the disturbance that the link joining them does not produce an out of limits signal; in this case, adjustment of the oscillators of switching centers 138 and 139 is blocked by the generation of conflicting signals by the link joining the switching centers 138 and 139 and the oscillators are prevented from responding to the signals from the links 137 and 139. This condition may be exemplified by the oscillators of switching centers 138 139 being both approximately 180° out of phase with the oscillator of switching center 137. As before, the selective removal of A and R signals as described will enable the restoration of synchronization of the oscillators.

In some more complex networks the simple control described above is not sufficient to overcome blocking if all links are organized as described above but this problem can be overcome by arranging that "cross-border" links have A and R signals inhibited at a switching center at the end of such a link whenever an out of limits signal occurs in any link connected to that switching center. This is effected by the signal on conductor 72 of FIG. 1.

FIG. 6 shows one example of a network of nine switching centers for which the method described above of releasing any blocking is effective. In this figure the three links 140, 141, and 142 shown as dotted lines are cross border links and are organized as described above. In any network containing a ring of more than three links at least one cross border link is required, the cross border link being a circumferential ink.

I claim:

1. A communication system for digital information including a plurality of switching centers joined by links, each switching center having individual oscillator means and means for aligning information receive on the or each link connected to the particular switching center with the oscillator means of that switching center by temporarily storing the received information, each aligning means having means for comparing the phase of the information received over the respective link with the phase of the oscillator means of the particular switching center to produce a signal representing the phase difference, the particular switching center including a plurality of further comparing means respective to the links connected to the switching center for comparing the phase difference signals from the comparing means in the aligning means at both ends of the link, each further comparing means being able to produce a first output signal when the phase difference signals applied to it differ by more than a first threshold value in a first sense, and a second output signal when the phase difference signals applied to it differ by more than a first threshold value in the opposite sense, means responsive to a first output signal to cause a predetermined increase in the frequency of the oscillator means of the particular switching center and a predetermined reduction in the frequency of the oscillator means of the switching center at the other end of the link, and means responsive to the second output signal to cause a predetermined reduction in the frequency of the oscillator means of the particular switching center and a predetermined increase in the frequency of the oscillator means of the switching center at the other link, the first and second output signals being produced to change the frequencies of the oscillator means in such sense as to reduce the difference detected by the the further comparing means, in which means are provided for disabling the control of the oscillator means by the first and second signals when both are present simultaneously from the same or different further comparing means.

2. A system according to claim 1, in which each further comparing means can produce a third output signal when the phase difference signals applied to it differ by more than a second threshold value greater than the first threshold value in either sense, each switching center including means responsive to a third output signal from any of the further comparing means of that center to disable the production of either a first or a second output signal from the further comparing means of the links connected to that switching center, one link at a time taken in a predetermined order, when both first and second signals are present simultaneously on separate links.

3. A system according to claim 1, in which each aligning means includes means for transmitting a signal representing the phase difference from the comparing means over the link to the further comparing means for the aligning means at the other end of the link, and means for receiving from the link a signal representing the phase difference from the comparing means to the aligning means at the other end of the link and for applying the received phase difference signal to the further comparing means for the particular link.

4. A system according to claim 1, in which the links joining the switching centers form one or more closed paths and the first threshold values of the further comparing means for the different links are so arranged that in any closed path the first threshold value of a direct link between two switching centers is less than the total of the first threshold values of the links forming another path between the two switching centers.

5. A system according to claim 1, in which the switching centers are divided into groups according to rank depending on their position in the network, the magnitude of the first threshold value of the further comparing, means depending on the lower of the ranks of the switching center joined by the respective link, the first threshold value being larger for switching centers of high rank, and the magnitude of the change in the frequency of the oscillator means of a switching center being inversely dependent on the rank of the switching center so that the switching centers of high rank are disturbed less than those of lower rank.

6. A system according to claim 2, in which each of certain of the switching centers includes means responsive to the third output signal from any of the further comparing means of the particular center for disabling the production of the first and second signals from one or more links connected to that switching center.

* * * * *